Dec. 31, 1935.   L. L. IRVIN   2,026,314
PARACHUTE PACK RELEASE MECHANISM
Filed June 13, 1933   4 Sheets-Sheet 1
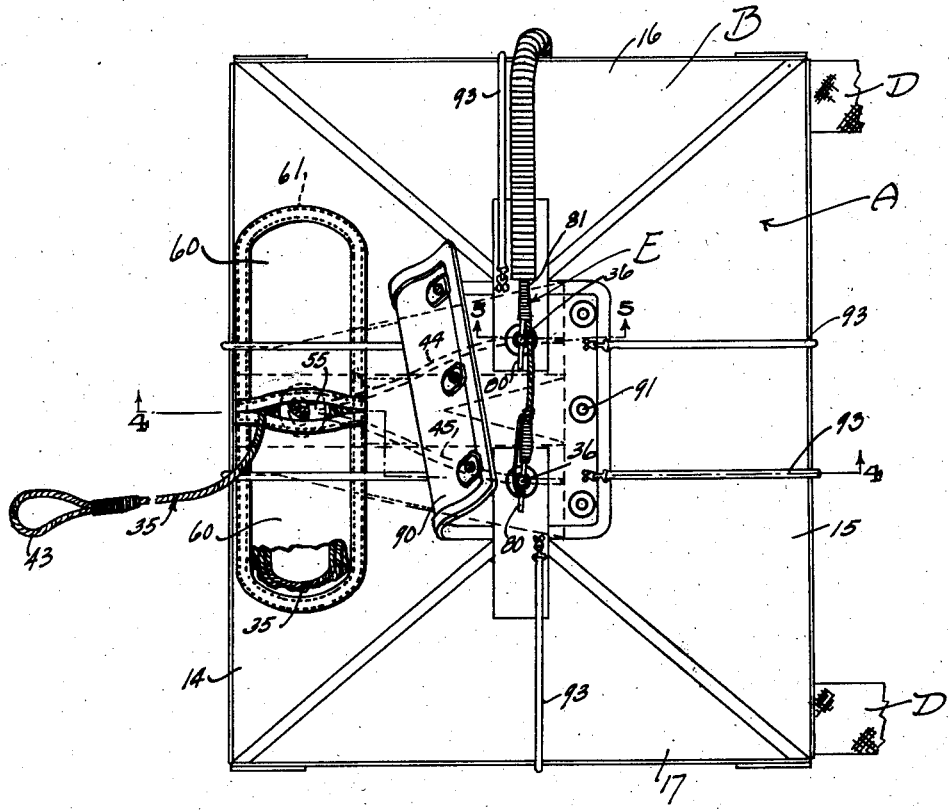
INVENTOR.
Leslie L. Irvin

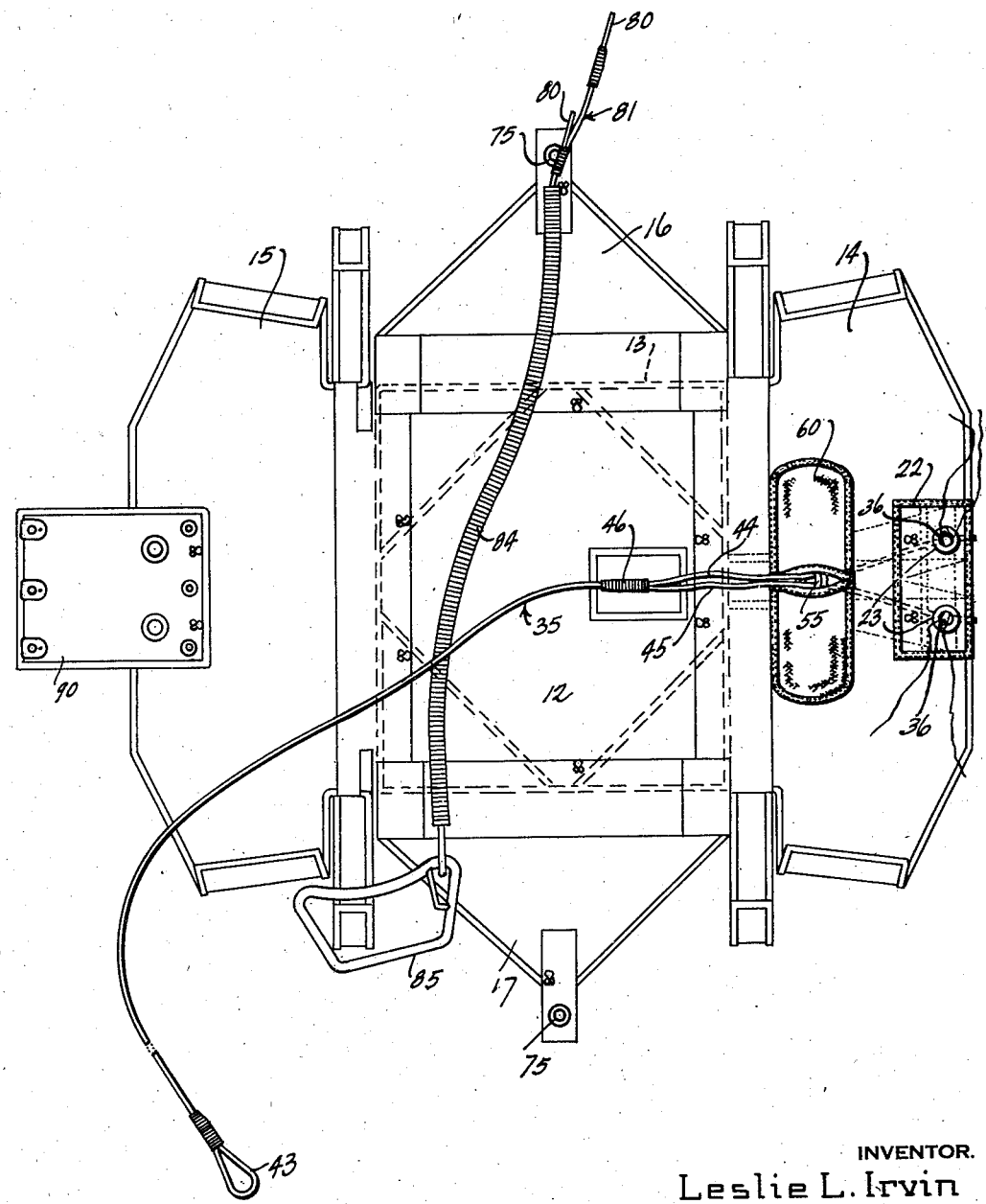

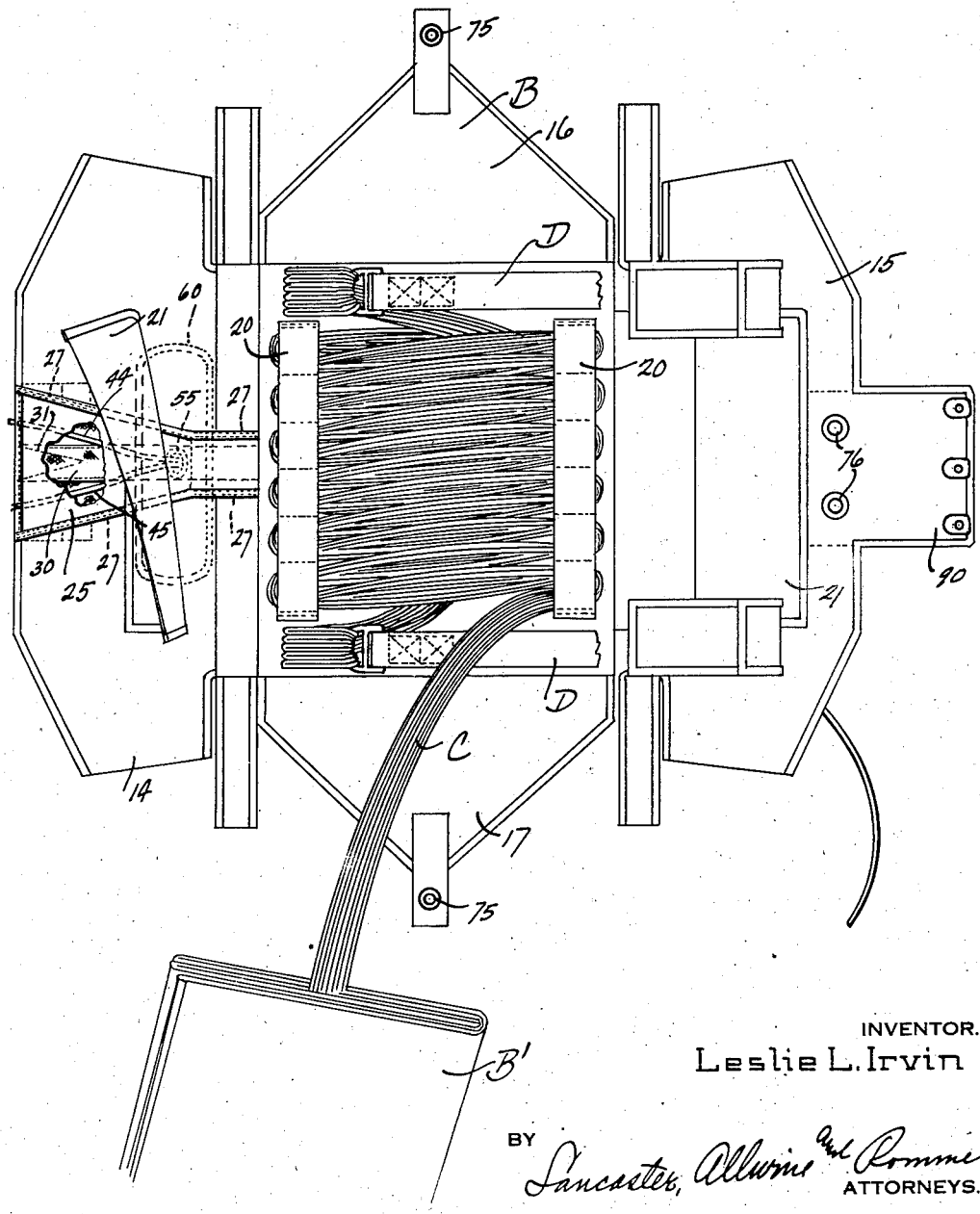

Dec. 31, 1935.  L. L. IRVIN  2,026,314
PARACHUTE PACK RELEASE MECHANISM
Filed June 13, 1933  4 Sheets-Sheet 4

INVENTOR.
Leslie L. Irvin
BY
Lancaster, Allwine and Rommel
ATTORNEYS.

Patented Dec. 31, 1935

2,026,314

UNITED STATES PATENT OFFICE 2,026,314

PARACHUTE PACK RELEASE MECHANISM

Leslie L. Irvin, Letchworth, Herts, England, assignor to Irving Air Chute Company, Inc., Buffalo, N. Y., a corporation Application June 13, 1933, Serial No. 675,602

14 Claims. (Cl. 244—21)

This invention relates to improvements in parachute apparatus.

The primary object of this invention is the provision of an improved parachute pack having improved means for the independent manual or automatic release opening thereof.

It is desirable under certain circumstances to have both manual and automatic means for opening a parachute pack. Rip cords for effecting the release opening of the pack, whether manual or automatic, should preferably be operated independent of one another. That is true because under general use, as when making a "free" jump the aviator uses the manual release entirely independent of the automatic release. The automatic release generally consists of a rip cord attached to the aircraft so as to cause the automatic opening of the pack, and should be operated independent of the manual release.

A further object of this invention is the provision of improved fastening means for parachute packs.

Other objects and advantages of the invention will be apparent during the course of the following detailed description.

In the accompanying drawings, forming a part of this specification, and wherein similar reference characters designate corresponding parts throughout the several views, Figure 1 is a plan view of the closure side of a parachute pack showing the improved fastener arrangement and rip cord control therefor.

Figure 2 is an outer plan view of the opened container of the parachute pack, showing more particularly the attached or static rip cord and the manually operated rip cord.

Figure 3 is an inside view of the container with the flaps opened and showing the shroud lines and other conventional features of a pack, the container showing on one of the flaps thereof the improved means for receiving a rip cord of the fastening means.

Figure 4 is a sectional view taken substantially on the line 4—4 of Figure 1.

Figure 5 is an enlarged sectional view taken through one of the fasteners of the parachute pack container, showing the association of rip cords therewith.

Figure 6:
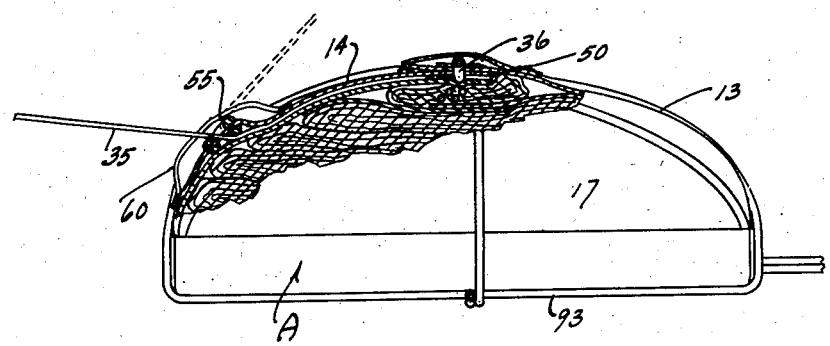
Figure 6 is a fragmentary sectional view similar to Figure 4 with the static or attached rip cord line pulled out of its pocket and ready to release the parachute from the pack container.
Figure 7:
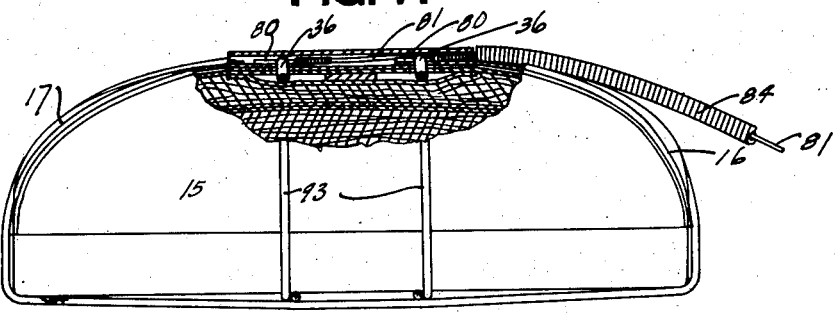
Figure 7 is a side elevation of the pack, showing in fragmentary section the fastening arrangement of the pack container longitudinally of the manually operated rip cord.

In the drawings, wherein for the purpose of illustration is shown only a preferred embodiment of the invention, the letter A may generally designate the parachute pack, which includes a container B adapted to receive in packed relation therein a parachute B', shroud lines C, and suspension lines D; the latter being part of the load supporting harness. Improved fastening means E is provided, including manual and automatic releases.

The parachute pack generally partakes of the "standard" pack as set forth in U. S. Patent #1,554,192. The container B includes a body wall 12 of semi-rigid character. It is square or rectangular in shape and has a wire frame 13 supported therein to hold the shape of the same. Main side flaps 14 and 15 are hingedly connected upon opposed sides of the body wall 12 and similarly end walls 16 and 17 are provided. The entire container is preferably of canvas or some other flexible material except for the shape providing frame 13. It is to be understood that the shape, size, and arrangement of parts of the container may vary considerably.

The packing arrangement of shroud lines and main and pilot parachutes is not essential so far as the present invention relates to pack fastener means and operating means therefor. However, the conventional packing system may be employed, which includes the placing of the ends of the suspension lines D, so that they extend into the pack; the shroud lines C being bundled together and packed zig-zag with the bight portions thereof tucked in suitable pockets 20 provided on the inner side of the supporting wall 12, as shown in Figure 3. The main parachute B' is packed zig-zag on top of the shroud lines, and if a pilot parachute is used flexible flaps 21 may be provided on the inner side of the flaps 14 and 15 to partition it from the main parachute, as is usual, and as set forth in U. S. Patent #1,403,983.

In the standard parachute pack, fastening studs are fixed upon a flap, equivalent to the flaps 14 of the present invention, releasably received within grommets provided upon all of the other main flaps of the container, and the rip cord prongs are slipped through the studs to hold the flaps assembled. In the present invention I desire to provide fastening studs which may be controlled by independently operated manual and automatic release rip cords, so as to depart as little as possible from standard parachute pack construction, and without complicating the pack.

The flap 14 is reinforced, as shown in Figure 2 of the drawings, by a rectangular shaped piece of material 22 at the free margin thereof between its ends. Grommets 23 are provided in the flap 14 at this piece 22. Preferably two of them are provided, although one or any other number may be provided. In the case of a back pack more than two should be provided. On the inside of this flap 14, as shown in Figure 3 of the drawings, is provided a tapered guard piece 25, preferably of flexible material, which extends transversely of the flap from the free margin thereof to the end connected with the body wall 12 of the container. This piece of material 25 may be stitched to the flap along its side margins at 27, and a piece of webbing 30 may be placed centrally between this flap 14 and the piece of material 25 and to which the piece of material 25 and flap may be stitched as at 31. Of course the piece of material 25 serves to provide a tunnel within which the prong ends of the attached rip cord 35 may operate and be separated from the parachute within the container. Also this piece of material serves to cover the grommets 23. At the free margin of the flap 14 the piece of material 25 is not sewed, to provide an opening, so that the fastener studs 36 may be entered in place in the grommets. This opening is indicated at 37 in Figure 5 of the drawings.

The fastener elements or studs 36 are of elongated substantially cylindrical formation having rounded convexed ends and being provided at the ends with passageways 41 and 42 at right angles to each other.

The automatically operated rip cord 35 may be of any desired length. It has sometimes been referred to as the static line and at one end may have a loop 43 for attachment in any convenient manner to the aircraft. The opposite end is bifurcated to provide flexible portions 44 and 45 connected to the body of the rip cord 35, at 46. The end of each of the prongs 44 and 45 is provided with a rigid pin or fastening prong 50 connected in the usual manner by wire wrapping and soldering at 51. This portion 51 provides a bulge and limits the insertion of the pin 50 through the eye opening 42 of the stud 36.

Figure 9:
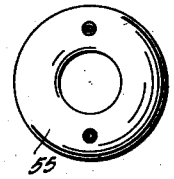
Figure 9 is a plan view of a guide eyelet upon which the attached rip cord fulcrums during a release pull.
Figure 10:
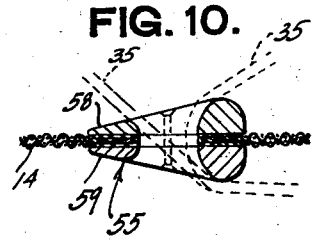
Figure 10 is a sectional view showing the said eyelet upon the pack container and in dotted lines showing the positions which the attached rip cord may assume with respect thereto during the pull to open the pack.

An improved metal eyelet 55, shown in detail in Figures 9 and 10 of the drawings, is provided in the flap 14, along the medial line thereof, through which the rip cord 35 extends from exteriorly of the pack into the tunnel provided between the flap 14 and the piece 25 above described. The end portions 44 and 45 of the rip cord are sufficiently long to extend at their connection 46 exteriorly of this tunnel when the pin or prong ends of this rip cord 35 are secured in the openings of the fastener studs 36, as can readily be understood from Figure 2 of the drawings. The guide eyelet 55 is of such construction that during a rip cord pull upon the wire rip cord 35 the latter will not be sharply bent, independent of the position of the pack, during a parachute drop, in order to prevent possibility of fracture or inability to function to release the pack. To that end the eyelet 55 comprises the circular sections 58 and 59 which are riveted together at opposite sides of the flap 14 and through the material of the flap. These sections 58 and 59 are thickest closest to the attachment of the flap 14 to the container, and therefrom gradually taper with a decreasing thickness in the direction of the free end of the flap. The two extreme pulling positions of the rip cord 35 are shown in dotted lines in Figure 10, and it can be readily understood that the rip cord will not be sharply bent.

Figure 8:
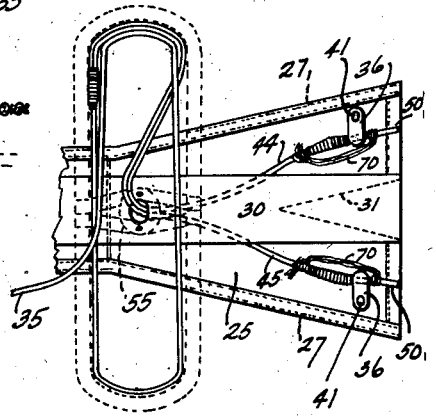
Figure 8 is a fragmentary view of the attached rip cord showing its relation with a flap of the parachute and in a pocket provided thereon.
Figure 11:
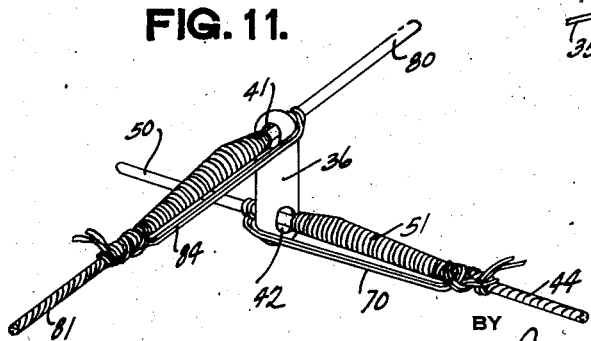
Figure 11 is a fragmentary enlarged view showing one of the pack container fastener studs in relation to the manual and attached rip cords and the safetying devices therefor.

Inasmuch as the static line is of considerable length, so as to enable the load to be clear of parts of the aircraft when an attached drop is made, it will be desirable to compact the rip cord 35 upon the pack. To that end an elongated pocket flap 60 is stitched at 61 upon the exterior of the flap 14 with its length parallel to the length of the flap 14. Intermediate its ends the piece of material 60 is split to provide a narrow opening immediately above the guide eyelet 55, as shown in Figure 1, and across the length of the pocket provided beneath the material 60. The automatic rip cord 35 is coiled back and forth within this pocket, and it will be understood from Figures 1 and 8 that the same may readily issue therefrom. The restricted opening to this pocket prevents accidental disconnection of the rip cord 35. This rip cord 35 is of flexible wire material and has a natural tendency to closely adhere to the outer circumferential parts of the pocket and thus to be restrained in the pocket. This may be further described as the springy tendency of the material of the rip cord 35 to assume a longitudinal as distinguished from a coiled condition.

The studs 36 each fit loosely and rotatably in the washers or grommets of the container, with its inner end at the inside of the pack and the outer end exteriorly of the pack. The prong ends 50 of the two strands 44 and 45 of the automatic rip cord 35 are assembled thru the openings at the ends of the stud and held thereon by means of safetying break cords 70. This break cord will of course rupture upon an operating pull upon the rip cord 35, to free the prong 50 from the studs. The ends 44 and 45 of the rip cord extend through the tunnel between the flap 14 and the piece of material 25 above described, and the ends of the studs 36 are extended through the eyelets 23. With the parachute and shroud lines properly packed the flap 14 is placed over the folded parachute and the other flaps 15, 16 and 17 are brought over the parachute and the grommets 75 thereof slipped over the outer ends of the studs 36. Of course some force is necessary to pull the studs through these eyelets in order to close and compact the flaps with the parachute and shroud lines closely packed and compacted within the container. This is a standard method of assemblage and consists in slipping short lengths of flexible cord through the grommets and through the passageways in the studs 36 in order to pull the studs through the grommets. The rigid prong ends 80 of the manually operated rip cord 81 are then slipped through the passageways 41 in the outer ends of the studs 36 and safetied at 84 in manner similar to the safety cord 70 above described.

The manually operated rip cord 81 is of conventional construction. It is preferably a flexible wire extended through a flexible guide housing and at its outer end is provided with a rip cord handle 85 functioning in the manner set forth in U. S. Patents #1,758,795 and #1,758,871. A guard flap 90 may be releasably snapped in place by "lift-the-dot" fasteners 91, over the prong ends of the manually operated rip cord, as shown in Figures 1 and 4 of the drawings.

The usual elastic cords 93 may be employed to quickly pull back the flaps upon release of the fastening means, so as to permit the contents of the pack to be readily released. While it is shown that these elastic cords 93 cross over the ends of the pocket wherein the static line is folded, they may be extended around the ends of the pocket through suitable guide rings, if found desirable, or passed through suitable tunnels beneath the pocket and the static cord at the inner side of the flap 14. In this manner the elastics will not be in any position to interfere with proper release of the static cord.

It will of course be understood that the pack may be of the seat type, lap type, chest type, or the detachable type which is adapted to be quickly clamped to a harness under emergency conditions, such as set forth in U. S. application, Serial No. 395,399, filed September 26, 1929. The harness may likewise be of any approved type, and the rip cord handle 85 retained in a pocket upon the harness in any approved manner.

The operation will be clear from the foregoing. For a manual release it is merely necessary to pull the handle 85 and release the prongs 80 of the manually operated rip cord from the outer ends of the studs 36. Of course the elastics 93 will throw the flaps open and completely expose the parachute. For an automatic operation the static line is attached to the aircraft and the wearer jumps. The static line 35 will readily deploy or uncoil from the pocket retaining it on the flap 14, and release the prong ends 50 thereof from the inside passageways of the studs 36. This frees the inner ends of the studs 36 so that the elastics of all of the flaps will readily throw back their flaps and completely expose the parachute. A desirable feature of the invention is the fact that both automatic and manually operated rip cords operate upon the same fastening studs, and the fastening studs are not lost if only one rip cord is pulled, due to the fact that they are safetied to both rip cords. It is quite apparent that either rip cord may be pulled entirely independent of the other.

It is of importance, due to the rough handling of parachute packs, since in many instances the aviator sits upon the same, to have all of the flaps positively attached by the releasable means, so that the parachute cannot become exposed by working loose of the flaps. In the dual release mechanism of the present invention all of the flaps are attached until one or the other rip cords are pulled. Thus proper protection of the parachute in the container is assured at all times. Furthermore, it is highly desirable, as during an emergency parachute drop from low altitude, to instantly deploy the main parachute. Upon pulling either rip cord of the present dual release mechanism the main parachute is instantly released, without the intervention of other container opening expedients.

It is of course within the contemplation of the invention to fixedly secure studs on one of the container flaps or parts so that they will extend through eyelets in another container flap or part in the direction of the inside of the pack, and to use merely one rip cord, either attached or manual, extending from exteriorly of the pack through the container in releasable engagement with the inner end of the stud.

Furthermore it is apparent that either the automatic or manual means may be connected with the inner ends of the fastening studs. Thus the automatic fastening device may be connected at the outer ends of the fastening studs and the manual device at the inner ends of the fastening studs, as desired.

Various changes in the shape, size, and arrangement of parts may be made to the form of invention herein shown and described, without departing from the spirit of the invention or the scope of the claims.

I claim:

1. In a parachute pack the combination of a parachute canopy receiving container having releasable parts to enclose the same, said parts having eyelets therein adapted to register when the container is closed, a releasable stud adapted to be positioned in said eyelets to hold the parts of the container closed, and a dual release means for the studs including an automatic release member releasably connected with one end of the stud and an independently actuable manual release member releasably connected with the opposite end of the stud.

2. In a parachute pack the combination of a container including a body portion provided with side and end flaps, said side and end flaps at their free ends each having eyelets adapted to be placed in registering relation when the container is closed, releasable studs entirely detachable from the container for extension through the registering eyelets, and releasable means locking the inner and outer ends of the studs in position to hold the eyelets and flaps thereof in container enclosing relation.

3. In a parachute pack the combination of a container having side and end flaps provided with eyelets adapted to be placed in registering relation to completely enclose a parachute packed in the container, a fastener stud for extension through the eyelets, and independently actuable rip cord devices releasably connected with opposite ends of the stud and holding the stud in fastening relation with said flaps.

4. In a parachute pack the combination of a container provided with relatively releasable portions, said portions having fastener means therefor including a stud extensible through an eyelet of at least one of said portions so as to project through said eyelet in the direction of the inside of said container, and a rip cord exteriorly of the container extended into the container and releasably connected with the inner end of said stud for releasably holding the portions of the container in parachute enclosing relation.

5. In a parachute pack the combination of a container having relatively releasable closure parts, and fastening means including selectively actuable manual and automatic rip cords, one of the rip cords releasably locking the closure parts externally of the container and the other extending from externally of the container into the container and releasably locking the closure parts internally of the container.

6. In a parachute pack the combination of a container having closure means provided with a grommet, fastening means to retain the closure means releasably shut including a stud releasably extensible into said grommet towards the inside of the container, a guide eyelet in the container, and a rip cord externally of the container extending through said eyelet and releasably connected with the inner end of the stud to hold the closure means shut.

7. In a parachute pack the combination of a container having closure means having a grommet, fastening means to retain the closure means releasably shut including a stud releasably extensible into said grommet towards the inside of the container, a guide eyelet in the container, a rip cord externally of the container extending through the eyelet and releasably connected with the inner end of the stud to hold the closure means shut, said eyelet of the container being of greater thickness closest to the stud and tapering with decreasing thickness away therefrom.

8. In a parachute pack the combination of a container including a body portion and opposed pairs of flaps, said opposed pairs of flaps each having an eyelet therein, a stud releasably extended through an eyelet of each of said flaps to hold the flaps in parachute enclosing relation, said stud extending at its outer and inner ends beyond said eyelets and having transverse passageways therethrough, a manually actuable rip cord having a locking prong extended through the passageway at the outer end of said stud, said container having an opening therein, and an automatically actuated rip cord extended through said opening into the container and provided with a prong releasably extended into the passageway of the inner end of said stud.

9. In a parachute pack the combination of a container including a body portion and opposed pairs of flaps, said opposed pairs of flaps each having an eyelet therein, a stud releasably extended through an eyelet of each of said flaps to hold the flaps in parachute enclosing relation, said stud extending at its outer and inner ends beyond said eyelets and having transverse passageways therethrough, a manually actuable rip cord having a locking prong extended through the passageway at the outer end of said stud, said container having an opening therein, an automatically actuated rip cord extended through said opening into the container and provided with a prong releasably extended into the passageway of the inner end of said stud, and safetying break cords holding the prongs of the respective rip cords assembled upon said stud.

10. In a parachute pack the combination of a pack including a container having relatively releasable parts to enclose the same, said parts having eyelets therein adapted to register when the container is closed, a stud for releasable extension through said eyelets and to project at its inner and outer ends beyond said eyelets, said inner and outer ends having transverse passageways therethrough, independently actuable rip cords releasably extended through said passageways of the stud at the inner and outer ends thereof, and safetying break cords holding the respective rip cords assembled upon the stud.

11. In a parachute pack the combination of a container having closure parts to enable the same to be releasably enclosed for housing a packed parachute therein, said parts having stud and eyelet means therein whereby the stud means have ends projecting through the eyelet means both at the inside of the container when closed and at the outside of the container when closed, and independent rip devices one of which is releasably connected with the stud ends within the container and the other of which is releasably connected with the stud ends at the outer side of the container to releasably hold the container parts in parachute enclosing position.

12. In a parachute pack the combination of a container having closure parts to enable the same to be releasably enclosed for housing a packed parachute therein, said parts having stud and eyelet means therein whereby the stud means have ends projecting through the eyelet means both at the inside and outside of the container when closed, independent rip devices one of which is releasably connected with the stud ends within the container and the other of which is releasably connected with the stud ends at the outer side of the container to releasably hold the container parts in parachute enclosing position, one of said rip means being a manually actuable device and the other being a device for connection with an aircraft as a static line.

13. In a parachute pack the combination of a container having closure parts to enable the same to be releasably enclosed for housing a packed parachute therein, said parts having stud and eyelet means therein whereby the stud means have ends projecting through the eyelet means both at the inside and outside of the container when closed, independent rip devices one of which is releasably connected with the stud ends within the container and the other of which is releasably connected with the stud ends at the outer side of the container to releasably hold the container parts in parachute enclosing position, one of said rip means being a manually actuable device and the other being a device for connection with an aircraft as a static line, and an apertured member mounted upon the container having the static line threaded therethrough in spaced relation from the releasable connected end of the static line with said stud means.

14. A fastening device for releasably holding a parachute pack closed comprising a stud having transverse openings at the ends thereof, said openings being disposed with their axes in transverse relation to one another, and release devices having fastener portions thereof releasably threaded thru said openings in outwardly projecting fastening relation beyond the opposite sides of said stud.

LESLIE L. IRVIN.